United States Patent [19]
Arvidsson

[11] Patent Number: 6,082,907
[45] Date of Patent: Jul. 4, 2000

[54] PRE-LOADING DEVICE FOR A RADICAL-BEARING UNIT

[75] Inventor: Thomas N. Arvidsson, Norrköping, Sweden

[73] Assignee: Andritz Inc., Muncy, Pa.

[21] Appl. No.: 08/930,505

[22] PCT Filed: Mar. 13, 1996

[86] PCT No.: PCT/US96/03396

§ 371 Date: Jan. 1, 1998

§ 102(e) Date: Jan. 1, 1998

[87] PCT Pub. No.: WO96/30661

PCT Pub. Date: Oct. 3, 1996

(Under 37 CFR 1.47)

[30] Foreign Application Priority Data

Mar. 31, 1995 [SE] Sweden .................................. 9501170

[51] Int. Cl.[7] ...................................................... F16C 23/06
[52] U.S. Cl. ........................................... 384/563; 384/556
[58] Field of Search ................................... 384/563, 517, 384/556, 557

[56] References Cited

U.S. PATENT DOCUMENTS

| | | | |
|---|---|---|---|
| 3,574,424 | 4/1971 | Hagemeister | 384/517 |
| 4,626,111 | 12/1986 | Swasey et al. | 384/557 X |
| 4,789,253 | 12/1988 | Perego | 384/517 |
| 4,923,313 | 5/1990 | Bergling | 384/571 |

*Primary Examiner*—Thomas R. Hannon
*Attorney, Agent, or Firm*—Alix, Yale & Ristas, LLP

[57] ABSTRACT

Axially spaced radial bearing units (30, 50) for a shaft assembly are pre-loaded by hydraulic pressure. Each of the bearing units is mounted to an axially displaceable seat (40, 60). The pre-loading pressure between the two bearing units (30, 50) is maintained at a constant pre-loading pressure by a hydraulic pressure which is exerted in chambers (44, 64) partially defined by the seats. A pressure accumulator (70) supplies pressure to the chambers (44, 64) so that a constant pre-loading pressure may be applied to the radial bearing units (30, 50) while allowing for axial displacement of the bearing units and the shaft (12).

9 Claims, 2 Drawing Sheets

PRE-LOADING DEVICE FOR A RADICAL-BEARING UNIT

CROSS-REFERENCE TO RELATED APPLICATIONS

This is the national stage of International Application No. PCT/US96/03396 filed Mar. 13, 1996.

BACKGROUND OF THE INVENTION

This invention relates generally to bearing units for rotatable shafts which are subject to high loadings. More particularly, the present invention is directed to devices for pre-loading a pair of axially spaced radial bearings for a rotatable shaft.

There are a number of applications wherein a cutting or grinding member, such as a disc in a disc mill or refiner, is mounted to a rotatable shaft and wherein during the operation, the shaft is subject to very large loads which may have significant axial and radial components relative to the rotational axis of the shaft. Shaft bearing units which permit efficient rotational operation of the shaft without substantial play under intense loading conditions are critical components of any such shaft assemblies. It is common to employ ring-like bearing units which may have conical, spherical or other shape bearing element configurations as radial bearings.

It is well-known that in order to achieve a substantially play-free shaft/bearing configuration, the bearing unit must be adapted to take into account both axial loading as well as radial loading. The axial loading on the shaft is often proportional to the radial loading. One conventional proposal to account for the axial/radial loading conditions is to incorporate tandem radial bearing units which are oriented in opposed relationship to the shaft. The outer rings of the bearing units are pre-loaded against each other by a spring assembly. While such units have proved to be advantageous, such units are substantially play-free in the axial direction. However, for many applications a limited axial displacement may be desirable for a number of reasons, including the accommodation of thermal expansion, which may be not insignificant when the shaft is subjected to intense loading conditions.

Some constructions have addressed the axial displacement problem by mounting the bearings within a bearing housing. Under certain conditions, the bearing housing is axially displaceable within a second primary housing.

Another approach to allowing for limited axial displacement is to mount the radial bearings in a separate bearing seat. A pre-loading device is disposed between the bearing seats to allow limited axial displacement in the bearing housing. The bearing seats are thus axially displaceable within the stationary bearing housing assembly.

For conventional devices, wherein the pre-loading force is implemented by spring units, the pre-loading force can vary during operation, especially as a result of varying operating temperatures. Consequently, if the bearings are not in close proximity, the spring pre-loaded bearing units may represent an impractical design approach. It is also established that in most applications, the applied radial loads can vary throughout the operation. The variability in the axial loads also may result in an associated axial pre-loading which increases or decreases proportionally.

In some applications, bearings for the shaft are pre-loaded by hydraulic systems. For example, U.S. Pat. No. 3,574,424 discloses an axial loaded bearing wherein a pair of axially spaced bearings are axially loaded by a circulating oil pressure system.

SUMMARY OF THE INVENTION

Briefly stated, the invention in a preferred form is a controllable pre-loadable bearing unit for a rotatable shaft assembly which is housed for rotation. A first bearing unit radially bears against the shaft assembly. The bearing unit is mounted in a seat which is received in the housing. A chamber associated with the first seat defines a pressure chamber for exerting an axial pre-loading pressure against the seat in a first axial direction. A second bearing unit is axially spaced from the first bearing unit for providing a second radial bearing interface for the shaft assembly. A second seat for the second bearing is disposed in the housing, and the second chamber is associated with the second seat to define a second pressure chamber for exerting an axial pre-loading pressure against the second seat in a second axial direction which is opposite the first direction. A communication line provides pressure communication between the two chambers. A pressure accumulator communicates with the line to pressurize the two chambers.

Each of the pressure chambers is defined by a portion of the seat, the housing and the associated seal rings. These seats are substantially identical but oppositely axially oriented with respect to the housing and shaft assembly. A regulator communicates with the pressure accumulator to regulate the pre-loading pressure in the chambers. Axial displacement of the shaft and/or a radial bearing unit is possible without affecting the pre-loading force exerted against the bearing unit.

An object of the invention is to provide a new and improved device for a radial bearing unit which may be axially pre-loaded in an efficient and controlled manner.

Another object of the invention is to provide a new and improved device for a radial bearing unit for a rotor shaft assembly which implements an axial pre-loading while permitting limited axial displaceability of the shaft assembly.

A further object of the invention is to provide a device for a radial bearing unit for a rotor shaft assembly which accommodates axial loading-induced displacement of the shaft while maintaining a substantially constant axial pre-load force on the radial bearing units.

Other objects and advantages of the invention will become apparent from the specification and the drawings.

DETAILED DESCRIPTION OF THE PREFERRED EMBODIMENT

Figure 1:
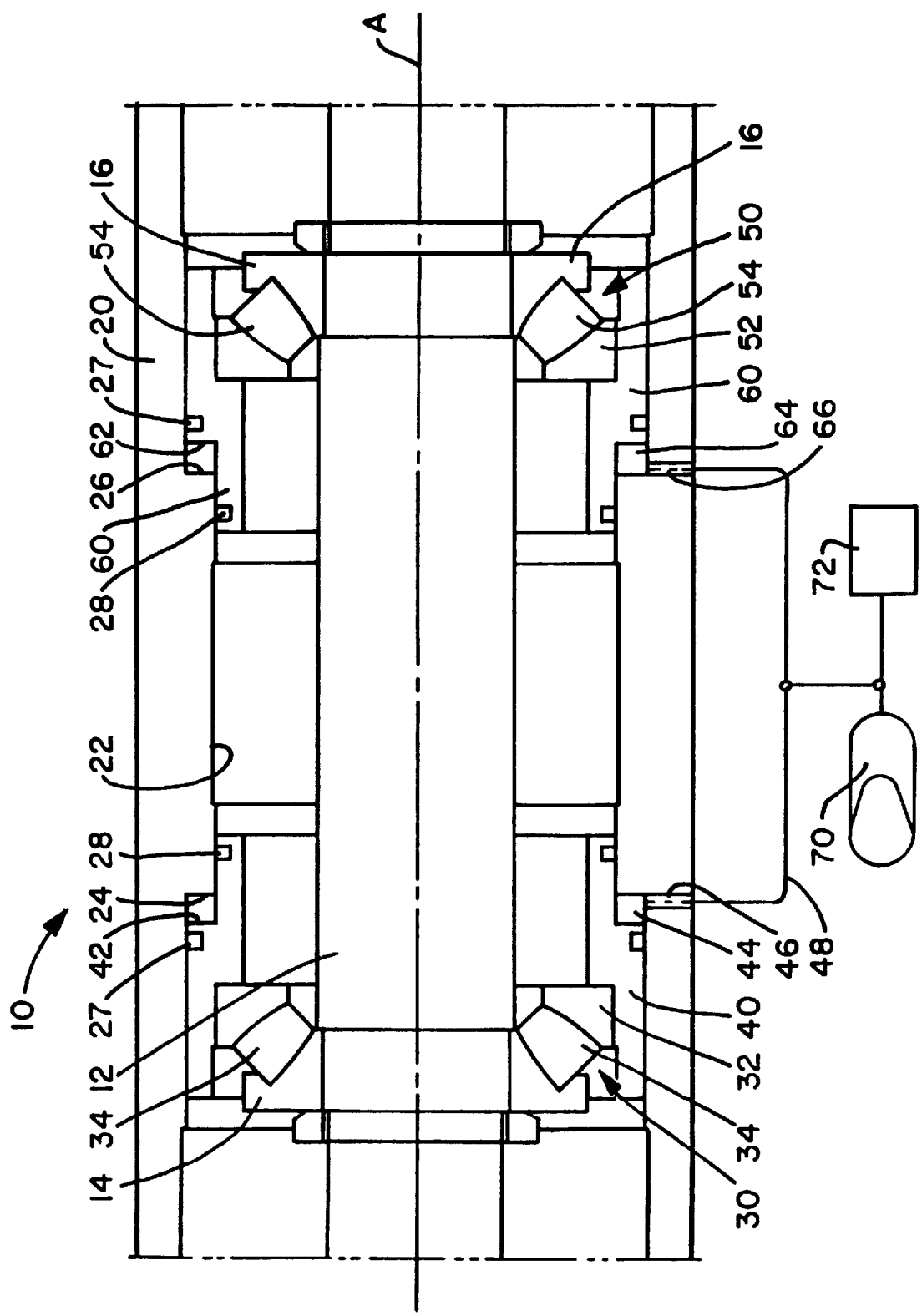
FIG. 1 is a central sectional view, partly in schematic, of an apparatus incorporating a pre-loading device for a radial bearing unit in accordance with the present invention.

With reference to the drawings, wherein like numerals represent like parts throughout the figures, an apparatus which incorporates a shaft and a controllable pre-loading device for a radial bearing unit for an axle or rotor shaft is generally designated by the numeral 10. The shaft 12 may be exemplary of any of a number of rotatable drive shafts which may mount a working head or member that is subject to intense loading during operation. The shaft 12 is rotatably mounted within the housing 20 for rotation about axis A. The invention is particularly suited for use in a disc refiner for ligno-cellulosic material.

Two axially spaced radial bearing units designated generally by the numerals 30 and 50 are mounted to the shaft 12 to provide a radial bearing interface for the shaft. Each of the bearing units 30, 50 has an outer ring 32, 52 which mounts a circular array of roller bearings 34, 54. The roller bearings engage an inner race ring 14, 16 which is axially and rotatably fixed to the shaft or integral with the shaft.

Each of the outer rings 32, 52 of the bearing units is received in respective seats 40, 60 which are received within the housing. The seats 40, 60 are substantially identical. The seats are axially displaceable relative to the housing but are rotationally keyed or fixed to the housing. The outer rings 32, 52 are axially fixed in relation to the respective seats 40, 60.

The housing 20 includes a central inner annular platform 22 which is defined by a pair of opposite annular radial shoulders 24, 26. Each of the seats 40, 60 has a stepped outer cylindrical surface of enlarged and reduced diameter and an annular radially extending shoulder 42, 62. Shoulders 24, 26 and 42, 62 are substantially equal in dimensions to provide a close-fitting relationship between the seats and the housing. Seal rings 27, 28 mounted in circumferential grooves of the seats seal each of the outer seat surfaces with the inner wall of the bearing housing and the platform, respectively, so as to provide a fluid tight chamber 44, 64 between the opposed annular seat shoulders 42, 62 and the platform shoulders 24, 26 as well as portions of the inner cylindrical wall of the housing and the outer wall of the reduced cylindrical surface.

Radial passages 46, 66 in the housing communicate with each of the hydraulic chambers 44, 64. A hydraulic pressure line 48 connects the passages and also communicates with a hydraulic accumulator 70. A pressure regulator 72, such as a relief valve, relief line or other type pressure regulator, connects with the accumulator for regulating the hydraulic pressure in the accumulator and hence controlling the hydraulic pressure which is supplied to each of the hydraulic chambers 44, 64.

The axial pre-loading of each of the bearing units 30, 50 is controllably determined by the hydraulic pressure in the respective chambers 44, 64. The chambers are configured so that the pressure exerts an effective equivalent pre-loading pressure on the seat shoulders 42, 62 in opposing axial directions. The pressure in the accumulator, and thus the axial pre-loading, is preset by the pressure regulator 72. It will be appreciated that the seat shoulder areas in the pressure chambers which are subject to the axial loading pressure are substantially equal in size. Since each of the chambers is connected to a common pressure line 48 which is pressurized by the accumulator 70, the axial pre-loading pressure is constant and equal for each of the bearing units 30, 50.

Figure 2:
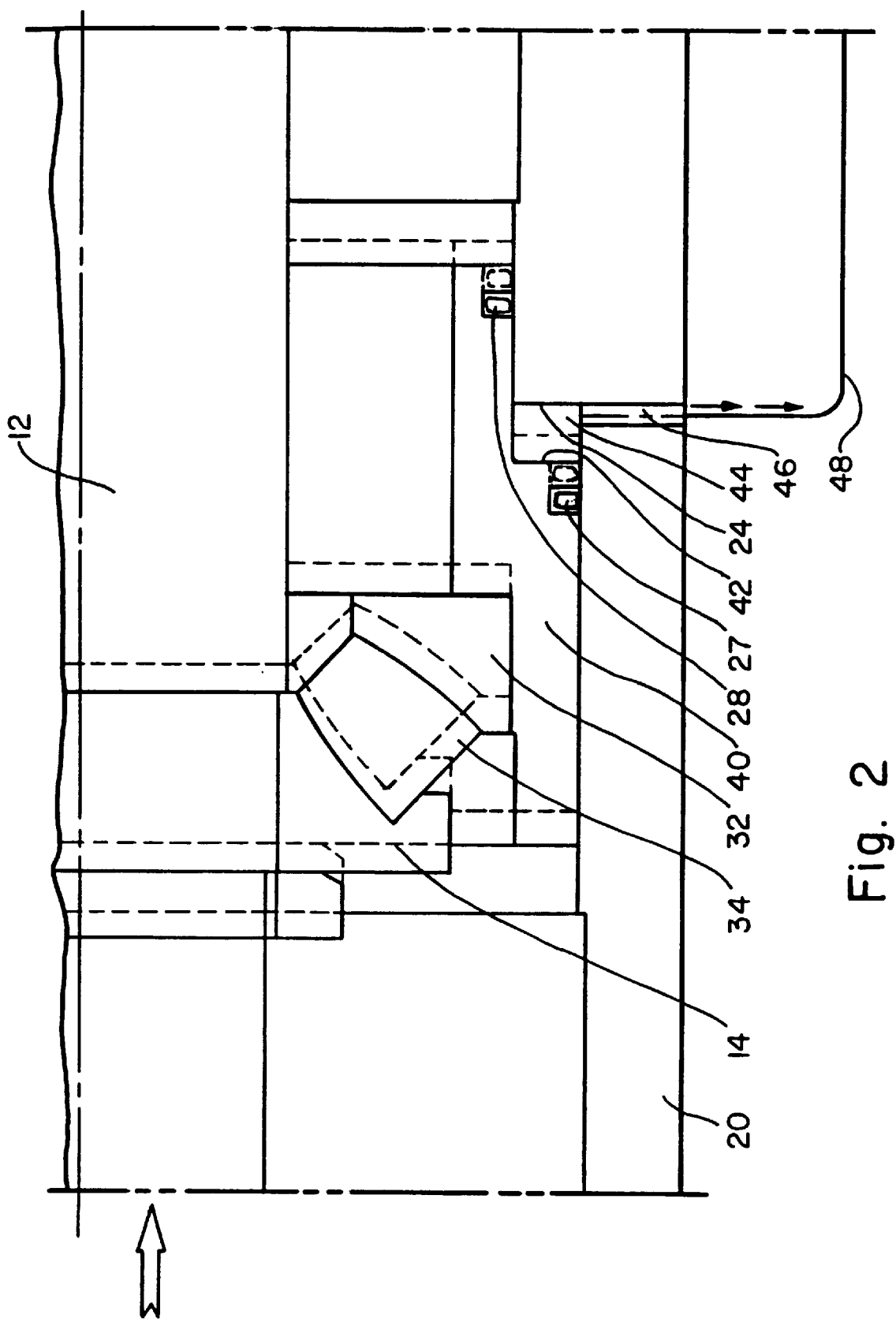
FIG. 2 is an enlarged fragmentary sectional view, partly in schematic and partly in phantom, of the apparatus of FIG. 1 further illustrating the axial loading characteristics of the invention.

With reference to FIG. 2, the pre-loading device is illustrated for a circumstance wherein an intense axial load in the direction of the heavy arrow is applied to the rotor shaft 12. The bearing seats 30, 50 and thus the bearing units are free to move in limited fashion axially in opposition to the pre-loading forces (as Illustrated by the phantom lines). Although the resultant chamber 44 may be compressed, the pre-load axial pressure against the bearing seat remains relatively constant since the pre-loading hydraulic medium pressure simultaneously communicates from compressed pressure chamber 44 to expanded chamber 64 (not illustrated in FIG. 2) via line 48 (in the FIG. 2 arrow direction) to equalize the loading on the opposed bearing units 30, 50. Naturally, for an axial displacement to the left of FIG. 2, the reverse flow of pressure medium from chamber 64 to chamber 44 to equalize loading pressure against the seat shoulder 42, 62 would occur.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A controllable pre-loadable bearing/shaft apparatus comprising:

a rotatable shaft assembly defining a rotational axis;

housing means for housing said shaft assembly for rotation about said axis;

first bearing means for bearing against said shaft assembly radially relative to said axis;

first seat means disposed in said housing means and axially displaceable therein for seating said first bearing means;

first chamber means associated with said first seat means for defining a first pressure chamber for exerting an axial pre-loading pressure against said first seat means in a first axial direction;

second bearing means axially spaced from said first bearing means for bearing against said shaft assembly radially relative to said axis;

second seat means disposed in said housing means and axially displaceable therein for seating said second bearing means;

second chamber means associated with said second seat means for defining a second pressure chamber for exerting an axial pre-loading pressure against said second seat means in a second axial direction opposite said first axial direction;

communication means for providing pressure communication between said first and second chambers; and pressure accumulator means communicating with said communication means for pressurizing said first and second chambers at constant pre-load pressure wherein a substantially uniform axial pre-loading force acts between the bearing means regardless of the axial load applied to the shaft assembly during operation.

2. The apparatus of claim 1 further comprising seal means for fluidically sealing between each said bearing seat means and said housing means.

3. The apparatus of claim 2 wherein each said pressure chamber is at least partially defined by said respective seat means, said housing means and said seal means.

4. The apparatus of claim 1 wherein each said pressure chamber is partially defined by said respective seat means.

5. The apparatus of claim 1 wherein each said bearing means comprises a bearing ring surrounding said shaft assembly.

6. The apparatus of claim 1 wherein each said seat means is substantially identical and axially oppositely oriented with respect to said housing means.

7. The apparatus of claim 1 wherein said pressure accumulator means comprises a hydraulic accumulator which supplies pressurized hydraulic fluid to said communication means.

8. The apparatus of claim 1 further comprising regulation means communicating with said pressure accumulator means for regulating the pre-loading pressure in said first and second chambers.

9. The apparatus of claim 8 wherein said regulation means comprises a pressure relief line.

* * * * *